Feb. 18, 1930.  L. STOLTENBERG  1,747,266
POTATO SORTER AND SACKER
Filed March 14, 1928  2 Sheets-Sheet 1
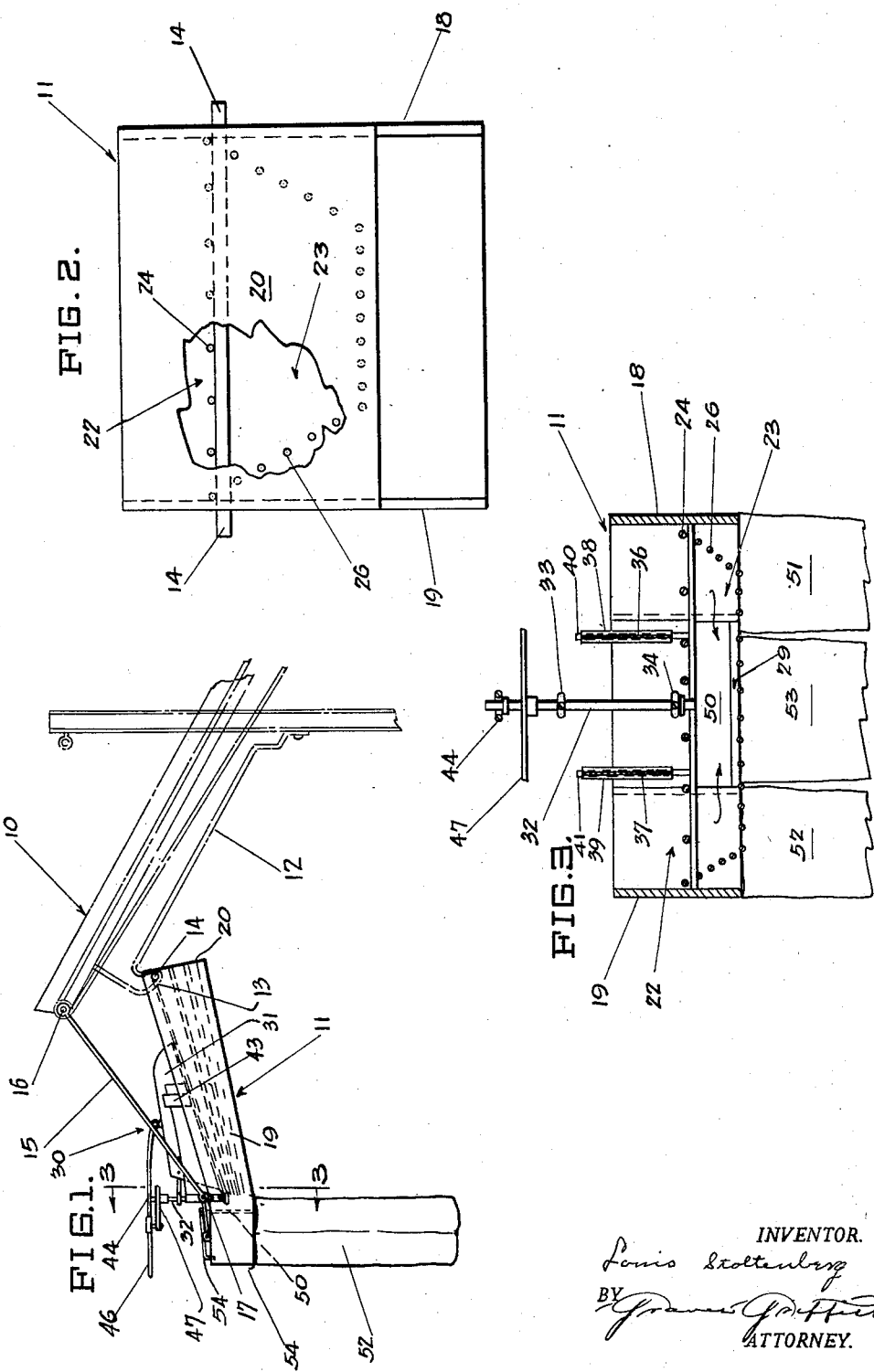
INVENTOR.
Louis Stoltenberg
BY
ATTORNEY.

Feb. 18, 1930.  L STOLTENBERG  1,747,266
POTATO SORTER AND SACKER
Filed March 14, 1928  2 Sheets-Sheet 2
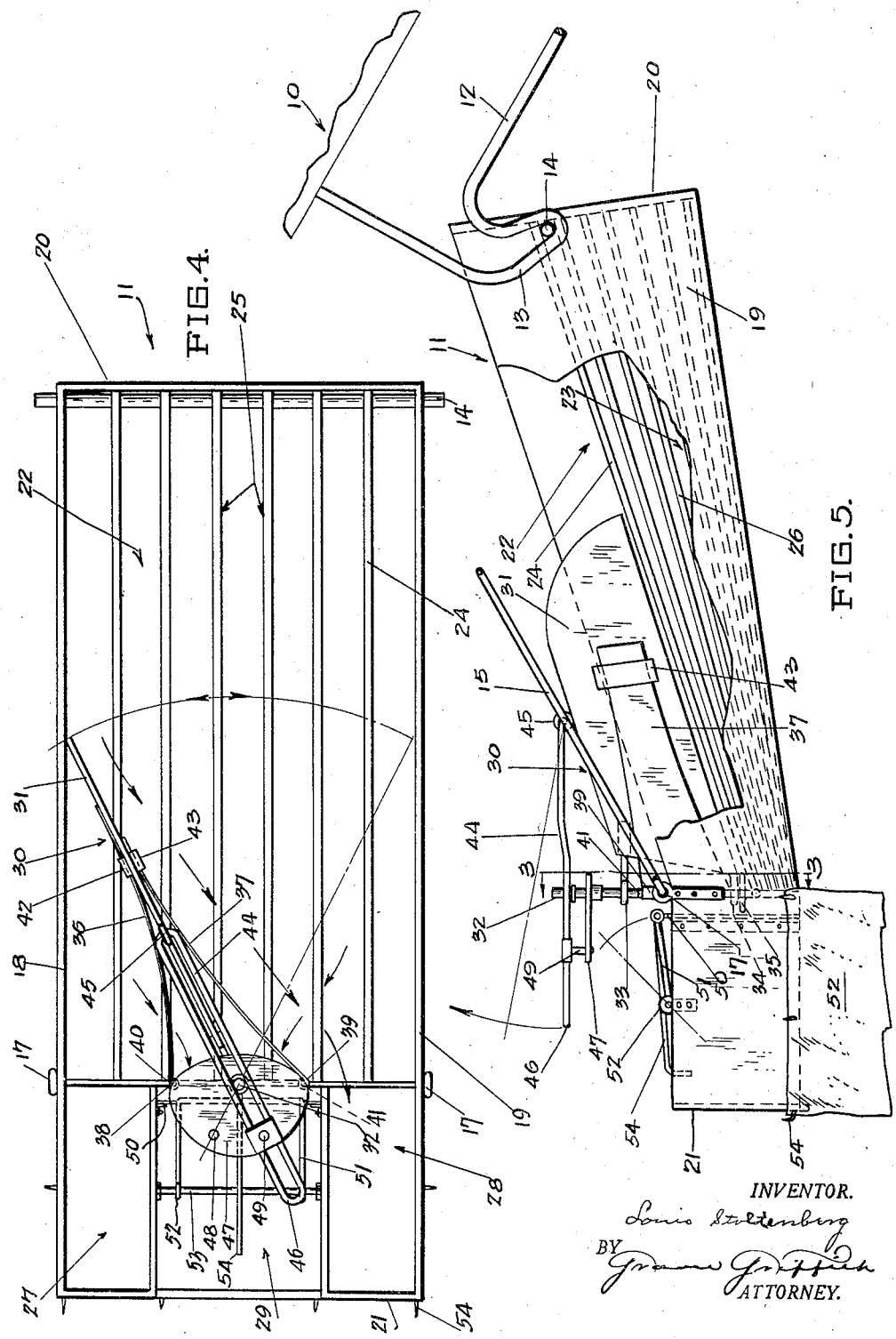
INVENTOR.
Louis Stoltenberg
BY
ATTORNEY.

Patented Feb. 18, 1930

1,747,266

UNITED STATES PATENT OFFICE

LOUIS STOLTENBERG, OF OAKLAND, CALIFORNIA

POTATO SORTER AND SACKER

Application filed March 14, 1928. Serial No. 261,443.

This invention relates to improvements in sorting and sacking devices, and with reference more particularly to devices of this character adapted for use in connection with potato harvesting machines for sorting and sacking the different grades or sizes of potatoes as finally delivered by the conveyors of machines of this character.

The present sorting and sacking device may be employed in conjunction with any of the various types of machines used in harvesting potatoes but is particularly adapted for use in combination with my improved potato harvesting apparatus shown and described in copending application, Serial No. 261,442, filed March 14, 1928.

Primarily, the object of my invention is to provide an efficient sorter and sacker of the character designated, embodying suitable means for the assortment of such potatoes as may be supplied thereto into at least two sizes and their diversion thereafter into appropriate sacks.

A further object of the invention is to provide a sorter and sacker of such character as to greatly facilitate the sorting and handling of large quantities of potatoes of varying sizes.

An additional object is to provide in a device of the class indicated means wherein are embodied at least two sorting compartments communicating with at least three discharge chutes, the combination being so arranged and manipulated that two grades of potatoes, as to size, may be simultaneously sorted and sacked by a single operator.

Ancillary to the foregoing is that of providing a sorter and sacker of simple construction and operation adaptable for use in connection with any potato harvesting device.

Other objects and advantages of my invention will become apparent with reference to the subjoined specification, and the accompanying two sheets of drawings, forming a part thereof and in which:

Figure 1 is a side elevation, showing the preferred embodiment of my invention in attached relation with the delivery conveyor of a harvesting apparatus;

Figure 2 is a rear view of the sorter and sacker per se, with a portion of the casing removed to disclose the upper and lower grading troughs;

Figure 3 is a transverse section, showing the relative arrangement of the grading troughs, the section being indicated by the lines 3—3, in Figures 1 and 5;

Figure 4 is a plan view, showing the upper trough, the intermediate and outer chutes, and the deflector mechanism for changing the course of the larger potatoes from one outside chute to the other; and Figure 5 is a side elevation of the apparatus, one side being broken away to show the deflector gate.

Referring with greater particularly to the drawings, the numeral 10 indicates the rear end of a potato harvesting machine's conveyor, this having been shown in Figure 1 in dot-and-dash lines since it forms no part of the present invention. The potato sorter and sacker 11 is suspended under the outer end of the conveyor 10 in any desired manner, though preferably as here shown, by means of frames 12 provided with notches 13 adapted to receive the transverse rods 14 extending through the rear end of the device's casing, the front end being supported by means of rods 15 extending from the shaft 16 of the conveyor to the eyes 17 carried by the sides of the casing, as shown in Figure 1.

The device comprises a casing of wood or metal having sides 18 and 19, and rear and front ends 20 and 21 respectively, the bottom being open, as shown. An upper trough 22 and a lower trough 23, both of grid-like character, are formed in this casing by means of a plurality of spaced rods 24 and a plurality of spaced rods 26, the spacing 25 of the rods 24 being of a width to permit the passage therethrough of the smaller potatoes to the lower trough 23, the larger being retained and borne along to the discharge end of the casing. The rods 26 forming the lower trough 23 are more closely spaced than are those of the upper trough and form a construction substantially U-shaped in cross-section and one gradually diminishing in depth and width as the discharge end is approached, as shown in Figures 2 and 3. The trough 22 communicates at its outer end with a pair of sack-chutes 27 and 28, the lower trough 23 being in communication in like manner with an intermediate chute 29, as is plainly indicated in Figure 4.

The deflector means 30 is mounted centrally the discharge end of the casing, as shown in Figures 3 and 4, and comprises a vertically disposed plate 31 carried by eye-members 33 and 34 and mounted for oscillatory movement about a shaft 32, the lower member thereof resting upon a stop 35 carried by the shaft 32, the said plate 31 being set to clear the rods 24 when swung from side to side, as shown in Figure 5.

Swingable guard-members 36 and 37 having hinge-members 38 and 39 formed at their outer ends and equally spaced on opposite sides of the shaft 32 are carried by upright rods 40 and 41, with their free ends slidably secured within clips 42 and 43 carried on opposite sides of the plate 31, as shown in Figure 4, these guards having their sides curved slightly, the better to deflect the potatoes to one or the other of the chutes 27 and 28, as is also shown in Figure 4, where the deflector is set to direct the potatoes into chute 28, the chute 27 being closed to permit the operator to change the sack on that side.

The means for operating and securing the deflector in a predetermined position consists of a link 44 embraced at its one end by an eye 45, which is secured to the upper edge of the plate 31, the link extending outwardly and normally embracing the upright shaft 32 and providing a lever-handle 46 at its outer end, for the convenience of the operator in swinging the link in a horizontal plane about the shaft 32 to cause the deflector to be brought into the desired position.

Means for locking the link 44 and the deflector in adjusted position consists of a plate 47 having perforations 48 therein, the plate being rigidly mounted upon the shaft 32 immediately beneath the link 44 and in position to be engaged by a pin 49 carried by the link, the outer end 46 of the link being raised slightly when it is desired to disengage the pin from the perforations 48 of the plate.

The lower trough 23 communicates with the intermediate chute 29 and may be closed by means of a gate 50 secured at its upper edge to a U-shaped rod 51 provided with eyes 52 embracing a supporting rod 53, the gate being adapted for opening by means of a lever 54 having one of its ends hingedly secured to the gate and its intermediate section resting upon the rod, this disposition serving as a fulcrum to facilitate the opening of the gate.

Assuming the device to be in attached relation with a potato harvesting machine that is in readiness to supply it with potatoes and to which a trailer has been coupled to for the convenience of an operator and to expedite the handling of the potatoes sacked and being sacked, the chutes 27, 28 and 29 are provided with sacks 51, 52 and 53, the mouths of which are supported in extended relation therewith by means of hooks 54 borne thereby, and an operator provided for the manipulation of the device and the expeditious handling of the sacks. With everything in readiness and the operator in place on the forward end of the trailer, the potatoes are first received by the upper trough 22. With the deflector, say in the position shown in Figure 4, the smaller potatoes will fall through between the rods 24 to the lower trough 23, the larger being retained and diverted by the deflector 30 to the chute 28 to be thence delivered to the sack 52, the smaller potatoes being delivered to the intermediate chute 29 and thence to the sack 53. Upon the filling of the sack 52, the operator moves the link-lever 46 to the left, as shown in dot- and-dash lines, causing the deflector to be swung to the right side of the trough in readiness to divert the potatoes into the chute 27 and thence into the sack 51, the filled sack 52 being removed and replaced by an empty one, the routine thus begun being continued at will.

The smaller potatoes in the trough 23, with the gate 50 open, gravitate to the chute 29 and thence into the sack 53, upon the filling of which, the gate is closed awaiting the removal of the filled sack and its replacement by an empty one. Obviously, the smaller potatoes compared with the larger being of greatly lessened quantity, the simpler provisions here made for their handling will be found sufficient to meet all requirements.

Having thus described my invention, I claim, and desire to secure by Letters Patent:

1. In a sorting and sacking device of the class described, a casing divided into upper and lower troughs, the upper of which is provided with a bottom formed of parallelly disposed rods of comparatively wide spacing, and the lower throughout of similar rods of comparatively close spacing, chutes communicating with said upper trough, an intermediate chute communicating with said lower trough, a gate in said intermediate chute, and a deflector means mounted in said upper trough adapted for alternately directing articles to the chutes of said upper trough.

2. In a sorting and sacking device of the class described, a casing divided into upper and lower troughs, the upper of which is provided with a bottom formed of parallelly disposed rods of comparatively wide spacing adapted for the retention of the larger articles received thereby while permitting the passage therethrough of the smaller ones to the lower trough, a pair of chutes communicating with said upper trough and an intermediate chute communicating with said lower trough, a gate in said intermediate chute for controlling the outlet from said lower trough, and a deflector mounted in said upper trough adapted to direct the outgoing articles therefrom to a selected upper trough chute.

3. In a sorting and sacking device of the class described, a casing divided into upper and lower troughs, said upper trough embodying a bottom of spaced rods, the spacing between rods being of a sufficient width to retain the larger articles received by said trough, and said lower trough being of substantially U-shape in cross-section and constituted of a plurality of rods in parallelism and adapted to retain the smaller articles as received from said upper trough, outer chutes communicating with said upper trough, an intermediate chute communicating with said lower troughs, and means for the control of said troughs selectively and their respective chutes.

In testimony whereof I hereunto affix my signature.

LOUIS STOLTENBERG.